United States Patent [19]
Calhoun

[11] 3,817,470
[45] June 18, 1974

[54] FLY FISHING REEL
[75] Inventor: Clyde D. Calhoun, Grant Twp., Washington County, Minn.
[73] Assignee: Minnesota Mining and Manufacturing Company, St. Paul, Minn.
[22] Filed: Oct. 12, 1972
[21] Appl. No.: 297,015

[52] U.S. Cl. ............................................ 242/84.2 B
[51] Int. Cl. ............................................ A01k 89/00
[58] Field of Search .................... 43/20; 242/84.2 B

[56] References Cited
UNITED STATES PATENTS
2,283,773  5/1942  Teitsma .............................. 43/20 X
2,744,693  5/1956  Albert .......................... 242/84.2 B
3,033,485  5/1962  Shearer ........................ 242/84.2 B Primary Examiner—Louis G. Mancene
Assistant Examiner—Daniel J. Leach
Attorney, Agent, or Firm—Alexander, Sell, Steldt & DeLaHunt

[57] ABSTRACT

A fishing reel having a cage surrounding a spool as in a conventional fly fishing reel, with the exception that the outer flange of the spool has a reduced diameter, spacing it from the guide ring and that the outer guide ring is severed to permit the line to be moved from between the rings to a position between the outer flange and the outer ring. The reel is also provided with a mounting structure permitting the reel to be pivoted on an axis normal to the axis of the spool.

1 Claim, 5 Drawing Figures

PATENTED JUN 18 1974 3,817,470
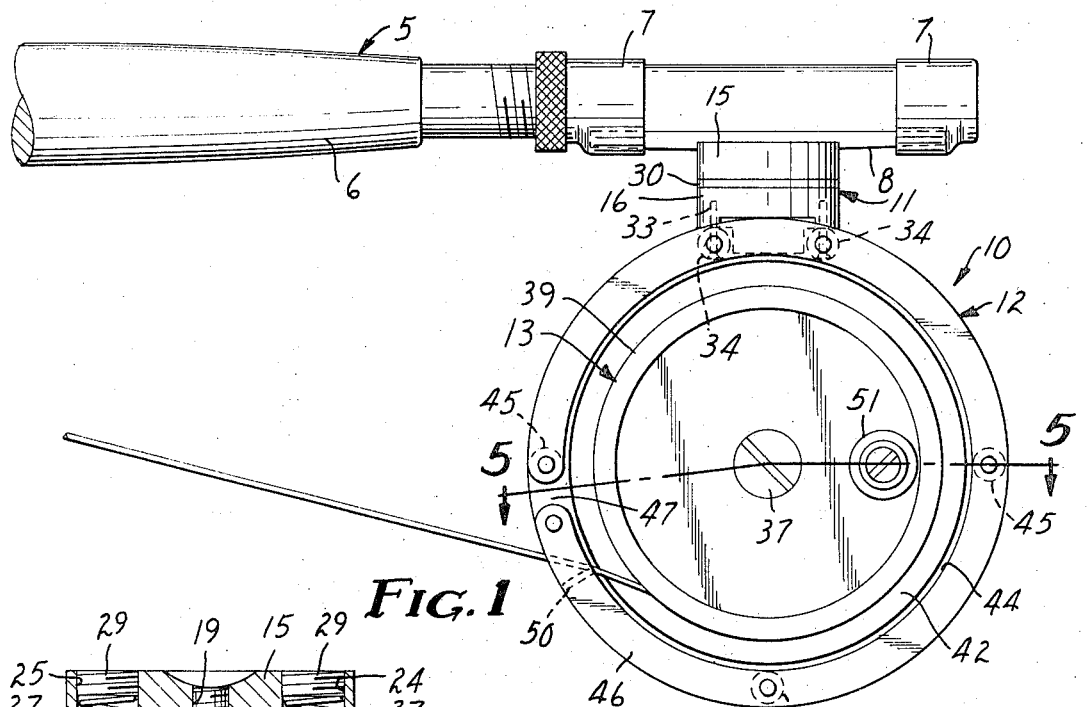
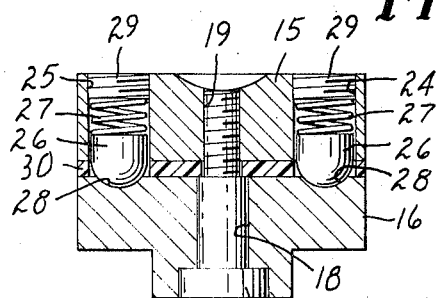
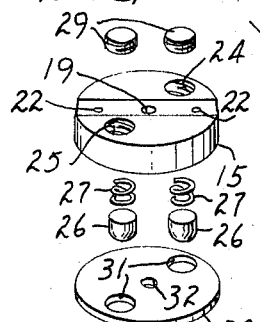
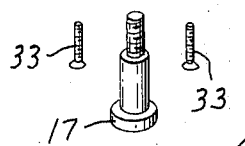
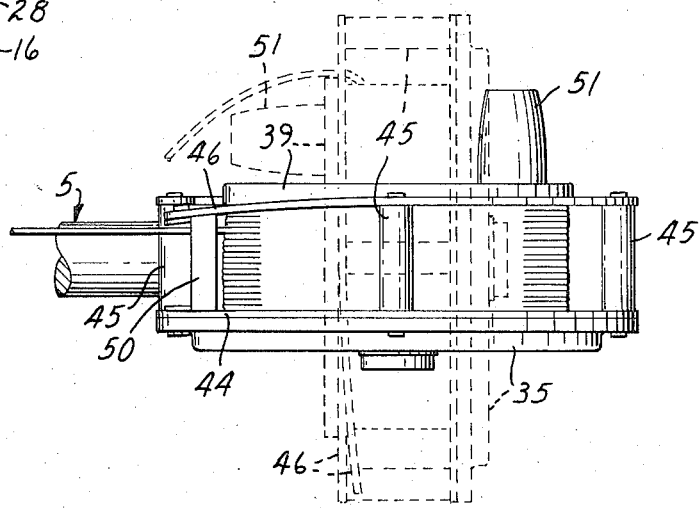

FLY FISHING REEL

BACKGROUND OF THE INVENTION

This invention relates to an improved fly fishing reel and in one aspect to an improved fishing reel which permits the casting of light line during fly fishing and adapting the fly fishing reel to a spinning reel.

The prior art shows several spin casting reels which are mounted to permit rotation of the reel relative to the axis of the rod to move the rotational axis of the reel from a position normal to the axis of the rod to a position parallel to the axis of the rod. Several of the prior art references teach the movement of the reel relative to a fixed frame supporting the reel, see U.S. Pat. Nos. 3,307,798; 3,370,806; and 3,384,320. U.S. Pat. No. 2,767,934, Miller, discloses a reel where the line guide ring is mounted on a member which pivots relative to the reel from a position axially aligned with the reel to a position normal to the axis of the reel which reel is fixed by a frame to the rod. This pivotal feature has not, to applicant's knowledge, been previously applied to fly reels to afford fly casting.

The present invention relates to improvements in reels which are particularly adapted for fly fishing. A fly fishing reel has a support for mounting the same to a fly rod, a spool support frame which is supported by the rod support member and which forms a cage about the periphery of a rotatable spool having a hub and a pair of parallel side flanges. The fixed frame generally supports on one axial end of the spool a support for the drive shaft for the spool and perhaps gear reduction means or a straight drive with a drag between the spool driving handle and the shaft for the spool. The reels are generally mounted such that the axis of the spool is normal to the axis of the rod with the reel disposed below the handle of the fly rod. The reel may be mounted such that the spool drive handle can be operated by a right-handed or a left-handed fisherman. The cage surrounding the spool permits the line to be drawn off of the spool between circumferentially spaced posts mounting the outer line guide ring adjacent the outer spool flange. When using these reels the fly fisherman usually winds light line onto the reel, and upon the light line when not in use, is wound the fly line. The fisherman works out the fly line by throwing the line back and forth in several folds and the light line is generally drawn then from the reel and placed near his feet such that when he wants to cast the fly line the light line may readily be drawn through the eyes on the rod. To retrieve the fly the fisherman merely drives the handle on the reel, rewinding the light line until the heavy line is again brought toward the end of the pole, and he draws the same in by hand, coiling the fly line at his feet. He then reworks the fly line to get the same into the air, and as the fly line goes out, he unreels some light line such that when he casts the fly line the light line will again be drawn through the eyes. The fly line during casting is not sufficiently heavy that it can produce the necessary moment to accelerate the spool wound with the light line so the light line can be cast directly from the reel. Thus, the fisherman is normally handicapped in that the light line must be unwound from the reel and placed at his feet in the boat or placed upon the water in front of him during casting. There is a danger of this line becoming tangled or caught as the same is being cast and the cast is destroyed.

SUMMARY OF THE PRESENT INVENTION

It is an object of the present invention to provide an improved fly fishing reel from which the light-retrieving line may be readily cast direct from the reel without necessitating the rotation of the reel. Another object of the present invention is to provide a fishing reel where the reel may be easily moved between a casting position and a retrieving position and the line quickly placed in the guide such that the same may be wound upon the reel.

The fly reel of this invention provides an improved device for the casting of a fly fishing line and the retrieval of the line and a reel which offers greater versatility than a conventional fly reel such that should a fisherman wish to switch from fishing with a fly to casting with a lure he can do so without necessitating the change of reels. It may be accomplished by changing spools in a reel or merely removing the fly line.

The reel of the present invention comprises a conventional saddle plate for mounting a reel to a rod, a support structure connected to the saddle plate permitting pivotal movement of the spool support frame relative to a rod and saddle plate. The reel comprises a spool support frame having a support plate which supports a perpendicularly-extending shaft journalling the spool. The spool comprises a hub and a pair of parallel flanges, the flange adjacent the support plate having a larger diameter than the flange on the outboard or open side of the spool. A drive may be provided on this support plate to drive the reel for rotation about the shaft or the handle may be coupled directly to the spool on the outer flange such that rotation of the handle mounted eccentric to the spool will rotate the spool. A line guide is positioned about the periphery of the flange adjacent the support plate and circumferentially spaced support posts extending axially therefrom support a guide ring about the periphery of the outer flange but in a position radially spaced from the periphery of the flange. The outer ring is formed with a discontinuity or slot therethrough permitting the line to be moved from between the guide rings from which it is drawn over the support posts to a position where it may be drawn over the outer spool flange. The support for the spool between the saddle plate and the spool support frame permits relative movement of the reel to the rod on an axis normal to the axis of the spool. Detents are provided for frictionally locking the reel in each rotated position. The reel provides for rotation about the axis such that one may position the spool with its axis parallel to the axis of the rod and swing it right or left such that the handle may be on the right-hand side of the rod or the left-hand side of the rod for retrieving the line with the spool axis perpendicular to that of the rod.

BRIEF DESCRIPTION OF THE DRAWINGS

The present invention will be more clearly defined with reference to the accompanying drawing wherein:

FIG. 1 is a fragmentary elevational view of a fly rod upon which is mounted a reel according to the present invention;

FIG. 2 is a bottom view of the reel and rod of FIG. 1 and illustrates in broken lines an alternative position of the reel relative to the rod;

FIG. 3 is a sectional view of the support member between the saddle plate and the spool support frame;

FIG. 4 is an exploded view of the several parts forming the support members; and FIG. 5 is a sectional view taken along the line 5—5 of FIG. 1.

DESCRIPTION OF THE PREFERRED EMBODIMENT

Referring now to the drawing there is shown in FIG. 1 a fly rod 5 having a hand grip 6 and a pair of the usual ring-type clamping members 7 which fit over the ends of a saddle plate 8 for rigidly securing the fishing reel, generally designated by the reference numeral 10, to the fishing rod 5.

The fishing reel of the present invention is identifiable most closely with a fly fishing reel. The fishing reel 10 comprises a support member 11 which pivotally mounts the spool support frame 12 to the saddle plate 8. The support member 11 permits the pivotal movement of the reel so a spool 13 thereon may be moved from a winding position where the axis of the spool is normal to the axis of the rod and a casting position wherein the axis of the spool 13 is parallel to the axis of the rod. Detent and recess means frictionally hold the reel in each position. The winding position is shown in solid lines in FIG. 2 and the casting position is shown in broken lines.

The support member 11 comprises a pair of disks or circular members 15 and 16, which are axially aligned and joined by a bolt 17 fitted through a receiving hole 18 in the member 16 and threadably secured in a threaded central bore 19 in the member 15. As shown, the first circular member 15 is suitably secured to the saddle plate 8. As illustrated the member 15 is secured by means of two screws extending through spaced holes in the saddle plate into openings 22 in aligned position in a groove in the member 15. The member 15 is provided with additional threaded openings 24 and 25 which extend therethrough. In the openings 24 and 25 are positioned a pair of tumblers 26 formed with hemispherical ends forming detents which are urged in an axial direction by means of compression springs 27 retained in the openings 24 and 25 by threaded plugs 29. The tumblers 26 are urged toward dimples or recesses 28 in the axial face of the member 16. The recesses 28 are spaced 90° about the face of the member 16 to define the positions the reel should assume. A polymeric washer 30 formed with openings 31 aligned with the openings 24 and 25 and a central opening 32 is positioned in axially aligned position with the support members 15 and 16. The polymeric washer limits the friction and wear between the opposed faces of the support members 15 and 16. A pair of screws 33 hold the spool support frame 12 to the member 16. The screws 33 extend through a pair of support posts 34 of the frame 12 and are tapped into holes in the member 16.

The spool support frame 12 comprises a support plate 35 having a spindle 36 fixed thereto which rotatably journals the spool 13. The spool is retained on the spindle by a screw 37 extending through an outer flange 39 on the outboard side of the spool spaced from the plate 35. In the reel illustrated, the spool 13 comprises a hub 41, the outer flange 39 and a second inner flange 42 having a diameter larger than that of the flange 39. The outer flange 39 may have a smooth chamfered periphery to afford the smooth withdrawal of the line. A cage surrounds the spool 13 and comprises a first support ring 44 secured to the plate 35 and in the plane of the flange 42. Circumferentially spaced axially extending posts 34 and 45 support a second guide ring 46 in spaced aligned relationship to the ring 44 and in generally the same plane as the flange 39. The ring 46 has an inner diameter greater than the diameter of the outer flange. The ring 46 is severed to provide discontinuity or a slot 47. One post 45 is positioned near one side of the slot and a line guide 50 which is generally U-shaped is positioned between the rings 44 and 46 adjacent the other side of the slot. The guide 50 has a shorter axial dimension than the posts and draws one end of the ring 46 closer to the ring 44. This slightly helical path of the outer surface of the ring 46 serves to guide the fishing line through the slot 47 to a position between the post 45 and guide 50 as the reel is moved from the casting position, broken line position illustrated in FIG. 2, with the spool axis parallel to the longitudinal axis of the rod 5 to the solid line winding position. The U-shaped guide 50 as shown aids to retain the line between the rings 44 and 46 during winding as illustrated in FIG. 1.

While fishing the reel may be rotated about the axis of the bolt 17 against the frictional force of the detents moving from one set of the recesses 28 to another. It is placed in the broken line, casting position and the line is placed over the edge of the flange 39 between the ring 46 and the flange. The line may thus be easily pulled from the spool 13 without rotation of the same. To rewind the line the reel is rotated 90° to place the axis of the spool normal to the axis of the rod and the fisherman may rotate the spool 13 by grasping the handle 51. The ability to cast the light line from the spool as opposed to having it unwound while casting avoids the possibility of the line becoming tangled or caught.

Having thus described this invention with respect to a specific embodiment illustrated in the drawing, it should be understood that changes may be made without departing from the spirit of the invention as described in the appended claim.

What is claimed is:

1. In combination, a fishing rod having a longitudinal axis, and a fishing reel mounted on said fishing rod, said fishing reel comprising
   a rotatable spool with a pair of parallel flanges providing an inner flange and an outer flange,
   a spool support member including a plate-like member having a spindle extending therefrom to rotatably support said spool,
   a cage mounted on said spool support member including a fixed ring spaced from said spool support member and in a plane generally parallel to the plane of said outer flange, said spaced ring having an inner diameter greater than the diameter of said outer flange and having a discontinuity therein permitting the fish line to be positioned between the ring and the outer flange to permit the line to be readily drawn axially from the spool for casting without rotation of the spool or to be positioned between the ring and spool support member to afford winding of the line on the spool, said ring being supported from said support member by a plurality of axially extending circumferentially spaced posts and a line guide extending between said spool support member and said ring at one end adjacent said discontinuity, said line guide having an axial dimension less than that of said posts to draw said one end of said ring adjacent said discontinuity closer to said support member to make it easier to move the line through said discontinuity, and reel mounting means for mounting said reel to said fishing rod, said mounting means including means for permitting movement of said spool support member and spool about an axis normal to the axis of said spool wherein the axis of said spool may be moved from a winding position normal to the longitudinal axis of said fishing rod to a casting position with the spool axis parallel to said axis of said fishing rod.

* * * * *